Oct. 5, 1954   J. H. MILLAR   2,691,058
ELECTROSTATIC SCREENING CONDUITS FOR ELECTRIC CONDUCTORS
Filed March 14, 1951
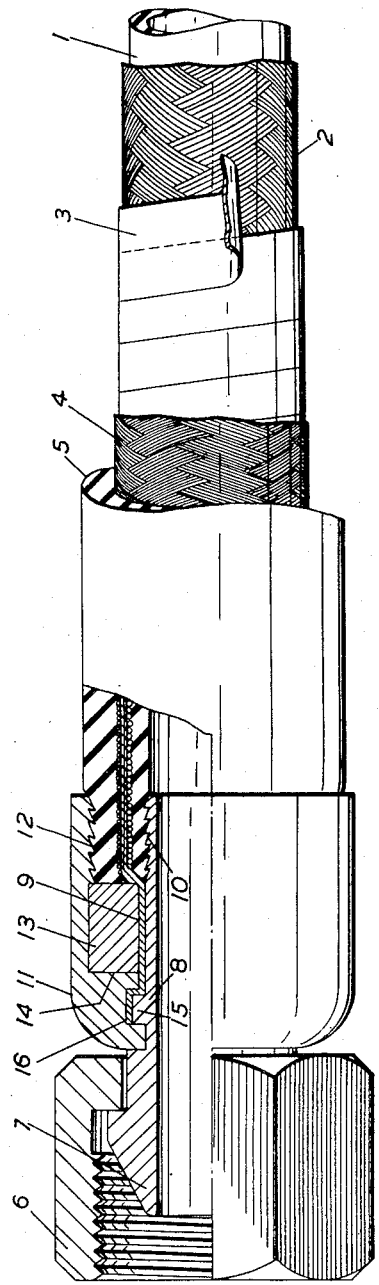
*Inventor*
JOHN HUMPHREY MILLAR
By *Lucker Luck*
Agents

UNITED STATES PATENT OFFICE 2,691,058

ELECTROSTATIC SCREENING CONDUITS FOR ELECTRIC CONDUCTORS

John H. Millar, Newport, R. I.

Application March 14, 1951, Serial No. 215,427

10 Claims. (Cl. 174—36)

This invention concerns improvements in or relating to electrostatic screening conduits, hoses, or sleevings (hereinafter called "conduits") for electric conductors and has particular reference to conduits for housing high tension cables such as are used in the engine ignition systems of aircraft and other craft or vehicles using internal combustion engines.

The primary object of this invention is to provide a means of electrostatically screening high tension cables in the ignition systems of aircraft so as to avoid interference with the radar, radio and like electronic apparatus carried by the aircraft or any adjacent aircraft, although it will of course be understood that the invention could be applied in other circumstances such as, for example, in the ignition systems of the engines of military vehicles, e. g. tanks and the like, for the purpose of avoiding interference with radar, radio and the like electronic apparatus, and in all other installations where effective electrostatic screening is important.

A further object of the invention is to provide electrostatic screening for electric conductors and at the same time provide protection for these conductors against mechanical damage, the entry of moisture, and the deteriorating effects of liquids and gases often encountered by such conductors.

According to this invention there is provided a flexible electrostatic screening and protective conduit for receiving one or more electric cables, such conduit comprising a flexible tube of moisture-proof electrically insulating material having a metallic reinforcement, and an electrostatic screen arranged around said tube and formed of strip metal foil wound about said tube with successive coils of the strip overlapping one another. Preferably the said reinforcement is formed by metal wire braided on to the said tube.

According to a further feature of the invention means are provided around the said wound strip metal foil for retaining the same in position on the tube; such retaining means may be formed wholly or partially of fine metal wire having a high electrical conductivity and closely braided on to the metal foil layer of the conductor so as to form a secondary electrostatic screen for the conduit as well as serving to retain the said foil in place on the flexible tube.

Thus according to a further aspect of the invention there is provided a flexible electrostatic screening and protective conduit for receiving one or more electric conductors or cables (hereinafter referred to as "cables"), such conduit comprising a tube of flexible moisture-proof electrically insulating material surrounded by a metallic braided reinforcement, at least one layer of metal foil arranged around the said braided reinforcement and formed by helically winding strip metal foil on to such braided reinforcement with successive coils of the foil overlapping one another so as to constitute a continuous electrostatic screen, and a secondary electrostatic screen arranged over the said metal foil screen.

By making the said secondary screen of closely braided fine metal wire, any interstices that there may be in the screen will be very small and the latter will thus, especially as the wire used is of a high electrical conductivity, constitute an efficient secondary electrostatic screen for the cables in the conduit.

The said metallic braided reinforcement also provides electrostatic screening to some extent, but since its principal function is to act as a reinforcement for the conduit it is preferably made of wire of somewhat heavier gauge than the wire used in the said secondary screen and in any case, because of its braided character, cannot be entirely impermeable to electrical energy radiated by a cable or cables within the conduit. Furthermore, for the purpose of physical strength, the said metallic braided reinforcement is formed of a wire of a high tensile strength. In a conduit having an internal diameter of 0.25 inch the wire used for forming the said secondary screen is conveniently of tinned copper wire, of about 0.006 inch diameter. The said foil is preferably about 0.0015 inch thick, whilst the wire of which the said reinforcing braiding is formed may, for example, be tinned Phosphor-bronze wire of about 0.010 inch diameter.

With conduits of larger internal diameter than 0.25 inch the wire used in the metallic braided reinforcement may be of a larger diameter than that named above, but the secondary screen is preferably still made of the same fine gauge high conductivity wire, whilst the foil thickness may in any case be increased, or even decreased, if desired.

Preferably the metal foil is wound upon the said braided reinforcement so that each turn formed overlaps the preceding turn by not less than twenty-five per cent and desirably by about half of its width in order that the turns will not separate to create gaps between them when the conduit is flexed.

If desired the conduit may be furnished with an outer cover or ply of flexible moisture-proof electrically insulating material and the material used for this outer cover may or may not be the same as that used for the inner tube around which the electrostatic screening is provided. Conveniently at least this inner tube is formed of rubber or synthetic rubber, which may be an oil resistant one, but it may be formed of any of the well known thermoplastic synthetic resins which are now used in the electrical industry for electrical insulating purposes.

According to a further feature of the invention the said conduit is provided at its ends with integral coupling means for attaching the conduit at its ends to like conduits and/or the accessories with which it is to be used.

Preferably the said coupling means at each end of the conduit comprises a tubular spigot inserted into the end of the conduit, the foil screen, the metallic braided reinforcement and the braided screen of the conduit being stripped or bared of the said rubber or like insulating material (on both sides where covered with such material internally and externally) and trapped on the said spigot by means of a ferrule surrounding the spigot, the ferrule and the spigot being contracted together and so secured to one another either by swaging the ferrule inwardly or expanding the spigot outwardly or by a combination of these operations.

Preferably the ferrule contains a bonding band formed of soft or readily deformable metal, such as aluminium, and which surrounds the said metallic portions of the conduit lying upon the spigot, the said bonding band being caused tightly to grip the metallic braidings and foil between itself and the spigot during the said swaging and/or expanding operation. Preferably the latter operation also ensures that the ferrule is so locked to the spigot as to prevent relative axial movement of the spigot and ferrule, by providing the spigot and the ferrule with interengaging annular parts. Thus the spigot may be provided with an integral circumferential external collar which is adapted to engage, when the spigot and ferrule are swaged together, in an internal annular groove in the ferrule. Desirably, in accordance with a further feature of this invention, the metallic braided reinforcement, the metal foil screening layer and the braided secondary screen are all trapped at their end portions in contact with one another between the said collar of the spigot and interlocking grooved part of the ferrule so that electrical bonding is provided between the said metallic parts of the conduit and the metallic end coupling thereof.

In order that the invention may be more readily understood, one embodiment of the same will now be described by way of example, with reference to the accompanying drawing.

In the embodiment of the invention shown in the drawing, the conduit comprises an inner tube 1 formed of flexible moisture-proof electrically insulating material such as rubber, a rubber composition, or one of the well known thermoplastic materials having similar moisture-proof and electrically-insulating properties to rubber, e. g. polyvinyl chloride materials. Around the tube 1 is braided a tubular metallic reinforcement 2 which is formed of wire having a high tensile strength; this wire is preferably tinned Phosphor-bronze wire and in the case of a tube 1 having an internal diameter of 0.25 inch, the wire is conveniently 0.010 inch diameter. The wire is preferably braided as closely as conveniently possible so that this metallic braided reinforcement serves as far as it can as an electrostatic screen around the tube 1.

Around the metallic braided reinforcement 2 is helically wound a strip 3 of metal foil so that the successive coils or convolutions of the strip overlap one another, preferably to not less than twenty-five per cent and desirably to about fifty per cent of the width of the strip so that, when the conduit is flexed, the electrostatic screen formed by the metal foil will remain intact and gaps will not appear between successive coils of the strip.

With a tube 1 of the internal diameter above referred to, the metallic foil strip 3 is preferably of 0.0015 inch thick. The strip itself is conveniently one inch wide. The metal foil used is preferably tinned copper foil but aluminum or other suitable metal foil having a high electrical conductivity may be used.

Around the electrostatic screen formed by the helically wound metal strip 3, the conduit is furnished with a further metallic braided wire sheath 4, the primary function of which is to serve as a secondary electrostatic screen but which also serves to maintain the strip 3 in place and additionally to reinforce the conduit. This secondary screen is formed of closely braided fine wire of high electrical conductivity as previously explained so that any interstices that there may be in the screen are very small; conveniently the wire used for forming the said secondary screen is tinned copper wire of 0.006 inch diameter.

The tube 1, reinforcing braiding 2, screening layer 3 and the secondary screening braiding 4 are wholly encased in an outer or cover sheath 5 preferably formed of the same material as the tube 1 so that the metallic interlayers 2, 3 and 4 are virtually embedded in the flexible insulating material so as to be covered and protected externally and internally thereby.

It will, of course, be understood that two or more layers of the metallic foil strip 3 may be employed if desired instead of only one layer and, if desired, these several layers of metallic foil may be wound immediately one upon the other or secondary screening layers 4 may be provided between successive layers or groups of layers of the metal foil 3.

In the embodiment of the invention shown in the drawing the conduit, formed as above described, is constructed as a unit for interconnection with similar coaxial units or for attachment to electrical apparatus and is furnished at its ends with appropriate integral couplings to enable these connections to be made. The form of these couplings will depend on how the conduit is to be used and the couplings may, for example, include a union or an elbow fitting. If the coupling is, for example, in the form of a union, this may be a union having a screw-threaded union nut or one furnished with a flange for bolting to the apparatus or other part to which the conduit is to be connected. However the drawing shows the conduit fitted with a union of more or less conventional form including a union nut 6 mounted on the outer enlarged externally frusto-conical head 7 of a tubular spigot 8 secured in one end of the conduit.

In applying the spigot 8 to the conduit, the composite metallic core 9 of the conduit formed by the braidings 2 and 4 and the strip 3 are stripped or bared internally and externally by removing therefrom end portions of the tube 1 and sheathing 5; then the spigot is inserted into the bore of the tube 1 to bring annular saw-teeth 10, with which the spigot is preferably annularly provided at the end portion remote from the head 7, into engagement with the interior of the tube 1 beyond the bared portion of the said composite metallic layer of the conduit.

Before the spigot 8 is inserted into the end of the conduit, a ferrule 11 is mounted coaxially on the end of the conduit so as to bring annular internal saw-teeth 12 of the ferrule over the end portion of the sheath 5, whilst the bared composite metallic layer 9 of the conduit lies coaxially within the ferrule 10 so as to be located between the latter and the spigot 8 when this is introduced into the conduit.

Within the ferrule 11 is also arranged an annular metallic bonding band 13 which is readily deformable and is conveniently formed of aluminium. This band is located between an inwardly directed shoulder 14 of the ferrule at the outer end of the latter and the internal teeth 12 of the ferrule and is adapted to have its outer periphery in engagement with the internal periphery of the annular wall of the ferrule whilst the inner periphery of the band 13 is adapted to engage the composite bared layer 9 of the conduit.

When the spigot and ferrule have been applied to the end of the conduit, the ferrule and spigot are closed together as, for example, by swaging the ferrule inwardly on to the spigot or by a contrary action such as by swaging the spigot outwardly into the ferrule; in the latter case the spigot would preferably initially be of a somewhat smaller diameter over at least a part of its length than the internal diameter of the tube 1 so that a substantially flush bore would finally be obtained in the finished conduit including its end fittings.

In contracting the spigot and ferrule together, the bonding band 13 is caused to grip the bared composite metallic layer 9 of the conduit between itself and the external surface of the spigot 8 which may be externally roughened at this position to increase its grip upon the said composite layer; moreover the band 13 is somewhat compressed and is tightly engaged against the internal periphery of the ferrule 11, against the shoulder 14 of the latter and also against the end of the outer sheathing 5 of the conduit. The teeth 10 of the spigot 8 and the teeth 12 of the ferrule 11 are also caused firmly to engage respectively in the tube 1 and the sheath 5 so that the spigot and ferrule obtain a very firm grip upon these parts.

In order to lock the ferrule against axial movement with respect to the spigot 8, the latter is provided with an annular external collar 15 and the ferrule 11 is furnished with an internal annular groove 16 into which the collar 15 passes when the ferrule and spigot are contracted together, and to increase the grip of the spigot and ferrule upon the bared metallic composite layer 9 of the conduit and to enhance the electrical connection between the metallic ferrule and spigot and this composite layer, the extremity of this layer is arranged so as to be trapped between the collar 15 of the spigot 8 and the base of the groove 16 in the ferrule 11 as shown.

It will be appreciated that the said composite metallic layer of the conduit is firmly gripped by the spigot and ferrule over a substantial area and that sound electrical connection is thus made between these parts, whilst the spigot and ferrule also obtain a firm grip upon the tube 1 and the sheathing 5 thereby relieving the metallic layers of the conduit of some of the stresses applied to the conduit. In uniting the ferrule and spigot to the conduit and to one another, the several metallic layers 2, 3 and 4 are brought into the closest contact with one another.

The conduit can be made in any suitable lengths and diameters according to the particular requirements which the conduit is to meet.

Preferably the cable or cables to be contained in the conduit will be entirely separable therefrom and simply be threaded into the conduit. Thus either the cable (or cables) or the conduit may be removed and renewed independently whenever necessary so that an economy is achieved in that one of these items can be replaced without having to replace the other.

As will be apparent, the invention provides an efficient flexible protective conduit for an electric cable or cables which has integrally formed therewith efficient electrostatic screening means for the cable or cables and which is furnished at its ends with integral couplings whereby the conduit may be readily attached to or detached from similar conduits or the apparatus or accessories with which the cable or cables is or are to be used.

A conduit constructed in accordance with this invention also provides good protection for the cable or cables against abrasion and the like and, if the tube 1 and/or sheathing 5 is or are formed of oil-resisting synthetic rubber or like material, the conduit will also afford protection to the cables against damage by solvent oils with which the conduit may come into contact. The conduit will also protect the cable or cables from damage by hot or other deleterious gases which the cable or cables might otherwise encounter.

It is also to be noted that the electrostatic screening conduit constructed in accordance with this invention is more efficient than those hitherto known and which have comprised spirally wound metallic hose, for in the case of such hose, considerable leakage of electrical energy occurred wherever the hose was flexed and moreover the hose developed distortion and fractured quite quickly in use. On the other hand, in the known metallic braided hoses electrostatic leaking took place through the interstices between the adjoining braided wires. The provision of a metallic foil layer or layers in the conduit as hereinbefore described avoids these disadvantages of existing conduits whilst the use of the fine braided secondary screen ensures that the foil shall remain in its continuous form even when the conduit is flexed and provides an auxiliary or supplementary screen around the foil layer or layers. In addition, the use of a metallic braided reinforcement or armouring provides the required strength in the conduit and relieves the metal foil layer or layers and the retaining sheath of stress.

I claim:

1. A flexible electrostatic screening and protective conduit for receiving one or more electric cables, said conduit comprising: a flexible tube of moisture-proof electrically insulating material; a metallic reinforcing layer formed of metal wire of high tensile strength braided on to said tube and surrounding the latter; a primary electrostatic screen comprising at least one continuous metallic layer surrounding said reinforcing layer and formed by strip metal foil wound about said tube with successive coils of said strip overlapping one another to a substantial extent; at least one secondary electrostatic screen surrounding said primary screen and retaining it upon said reinforcing layer, such secondary screen being formed of fine metallic wire having a high electrical conductivity and braided upon said primary screen; flexible moistureproof electrically insulating sheathing surrounding said secondary screen; and metallic coupling means at each end of said conduit in electrical contact with said primary and secondary screens and said reinforcing layer of the conduit, said coupling means including a tubular metallic spigot inserted into the corresponding end portion of the conduit and a metallic ferrule surrounding said spigot and engaging over the exterior of the corresponding end portion of said conduit, the end portions of said primary and secondary screens and said reinforcing layer of the conduit being stripped of said tube and sheathing and each such stripped end portion being trapped between said ferrule and said spigot mechanically and electrically to unite them to the latter, in combination with a soft metal annular readily deformable bonding band disposed within said ferrule around the corresponding stripped end portion of said metallic screens and reinforcing layer, said band being mechanically compressed between said ferrule and said spigot electrically and mechanically to bond said metallic screens and reinforcing layer to said spigot.

2. A conduit according to claim 1, wherein the said spigot and ferrule have interlocking annularly arranged parts to retain them against relative axial movement.

3. A conduit according to claim 2, wherein the said stripped end portions of the metallic screens and reinforcing layer at each end of the conduit are clamped between the said annularly arranged interlocking means of the said spigot and ferrule.

4. A conduit according to claim 3, wherein the said spigot and ferrule respectively have external and internal annular teeth for gripping respectively the said tube and the said sheath.

5. An electrostatic screening and protective conduit for receiving one or more electric cables comprising: a tube of moisture proof electrically insulating material; a metallic reinforcing layer surrounding said tube; an electrostatic screen comprising at least one continuous metallic layer surrounding said reinforcing layer; a moistureproof electrically insulating sheathing surrounding said electrostatic screen; metallic coupling means at each end of said conduit in electrical contact with said screen and said reinforcing layer of the conduit, said coupling means including a tubular metallic spigot inserted in each end portion of the conduit, a metallic ferrule surrounding said spigot and engaging the exterior of said moistureproof electrically insulating sheathing which surrounds said primary electrostatic screen, the end portions of said reinforcing layer and said electrostatic screen being stripped of said tube and said sheathing and gripped between said ferrule and said spigot mechanically and electrically to unite them to said spigot; and an annular soft metal readily deformable bonding band disposed within said ferrule around the corresponding stripped end portions of said reinforcing layer and said screen, said band being mechanically compressed between said ferrule and said spigot electrically and mechanically to bond said layer and said screen to said spigot.

6. An electrostatic screening and protective conduit for receiving one or more electric cables comprising: a tube of moistureproof electrically insulating material; a metallic reinforcing layer surrounding said tube; an electrostatic screen comprising at least one continuous metallic layer surrounding said reinforcing layer; a moistureproof electrically insulating sheathing surrounding said electrostatic screen; metallic coupling means at each end of said conduit in electrical contact with said screen and said reinforcing layer of the conduit, said coupling means including a tubular metallic spigot inserted in each end portion of the conduit, a metallic ferrule surrounding said spigot and engaging the exterior of said moistureproof electrically insulating sheathing which surrounds said primary electrostatic screen, the end portions of said reinforcing layer and said electrostatic screen being stripped of said tube and said sheathing and gripped between said ferrule and said spigot mechanically and electrically to unite them to said spigot; and an annular metal bonding band disposed within said ferrule around the corresponding stripped end portions of said reinforcing layer and said screen, said band being mechanically compressed between said ferrule and said spigot electrically and mechanically to bond said layer and said screen to said spigot.

7. A flexible electrostatic screening and protective conduit for receiving one or more electric cables comprising: a flexible tube of moisture proof electrically insulating material; a metallic reinforcing layer formed of metal wire surrounding said tube; an electrostatic screen comprising at least one continuous metallic layer surrounding said reinforcing layer; a flexible moistureproof electrically insulating sheathing surrounding said electrostatic screen; metallic coupling means at each end of said conduit in electrical contact with said screen and said reinforcing layer of the conduit, said coupling means including a tubular metallic spigot inserted in each end portion of the conduit, a metallic ferrule surrounding said spigot and engaging the exterior of said moistureproof electrically insulating sheathing which surrounds said primary electrostatic screen, the end portions of said reinforcing layer and said electrostatic screen being stripped of said tube and said sheathing and gripped between said ferrule and said spigot mechanically and electrically to unite them to said spigot; and an annular soft metal readily deformable bonding band disposed within said ferrule around the corresponding stripped end portions of said reinforcing layer and said screen, said band being mechanically compressed between said ferrule and said spigot electrically and mechanically to bond said layer and said screen to said spigot.

8. An electrostatic screening and protective conduit for receiving one or more electric cables comprising: a tube of moistureproof electrically insulating material; a metallic reinforcing layer formed of metal wire braided on said tube and surrounding the latter; an electrostatic screen comprising at least one continuous metallic layer surrounding said reinforcing layer and formed by strip metal foil wound about said tube with successive coils of the strip overlapping one another to a substantial extent; a moistureproof electrically insulating sheathing surrounding said electrostatic screen; metallic coupling means at each end of said conduit in electrical contact with said screen and said reinforcing layer of the conduit, said coupling means including a tubular metallic spigot inserted in each end portion of the conduit, a metallic ferrule surrounding said spigot and engaging the exterior of said moistureproof electrically insulating sheathing which surrounds said primary electrostatic screen, the end portions of said reinforcing layer and said electrostatic screen being stripped of said tube and said sheathing and gripped between said ferrule and said spigot mechanically and electrically to unite them to said spigot; and an annular soft metal readily deformable bonding band disposed within said ferrule around the corresponding stripped end portions of said reinforcing layer and said screen, said band being mechanically compressed between said ferrule and said spigot electrically and mechanically to bond said layer and said screen to said spigot.

9. A flexible electrostatic screening and protective conduit for receiving one or more electric cables comprising: a flexible tube of moistureproof electrically insulating material; a metallic reinforcing layer formed of metal wire braided on said tube and surrounding the latter; an electrostatic screen comprising at least one continuous metallic layer surrounding said reinforcing layer and formed by strip metal foil wound about said tube with successive coils of the strip overlapping one another to a substantial extent; a flexible moistureproof electrically insulating sheathing surrounding said electrostatic screen; metallic coupling means at each end of said conduit in electrical contact with said screen and said reinforcing layer of the conduit, said coupling means including a tubular metallic spigot inserted in each end portion of the conduit, a metallic ferrule surrounding said spigot and engaging the exterior of said moistureproof electrically insulating sheathing which surrounds said primary electrostatic screen, the end portions of said reinforcing layer and said electrostatic screen being stripped of said tube and said sheathing and gripped between said ferrule and said spigot mechanically and electrically to unite them to said spigot; and an annular metal bonding band disposed within said ferrule around the corresponding stripped end portions of said reinforcing layer and said screen, said band being mechanically compressed between said ferrule and said spigot electrically and mechanically to bond said layer and said screen to said spigot.

10. A flexible electrostatic screening and protective conduit for receiving one or more electric cables, such conduit comprising a flexible tube of moistureproof electrically insulating material, a metallic reinforcing layer formed of metal wire of high tensile strength braided on to said tube and surrounding the latter; a primary electrostatic screen comprising at least one continuous metallic layer surrounding said reinforcing layer and formed by strip metal foil wound about said tube with successive coils of the strip overlapping one another by substantially 50 per cent of the width of the strip; at least one secondary electrostatic screen surrounding the said primary screen and retaining it upon the said reinforcing layer, such secondary screen being formed of fine metal wire having a high electrical conductivity and braided upon said primary screen, a flexible moistureproof electrically insulating sheathing surrounding said secondary screen, said conduit being provided at the ends thereof with metallic coupling means in electrical contact with the said primary and secondary screens and said reinforcing layer wherein each of the said coupling means includes a tubular metallic spigot inserted into the corresponding end portion of the conduit, and a metallic ferrule surrounding said spigot and engaging over the exterior of the said corresponding end portion of the conduit, and wherein the end portions of the said metallic primary and secondary screens and said metallic reinforcing layer of the conduit are stripped of the said tube and sheathing and each such stripped end portion is trapped between the said ferrule and spigot mechanically and electrically to unite them to the latter.

References Cited in the file of this patent

UNITED STATES PATENTS

| Number | Name | Date |
|---|---|---|
| 749,633 | Seeley | Jan. 12, 1904 |
| 1,890,290 | Hargreaves | Dec. 6, 1932 |
| 2,379,318 | Safford | June 26, 1945 |
| 2,438,146 | Candee et al. | Mar. 23, 1948 |
| 2,447,168 | Dean et al. | Aug. 17, 1948 |
| 2,479,483 | Ekleberry | Aug. 16, 1949 |
| 2,514,905 | Solero | July 11, 1950 |
| 2,539,230 | Craig | Jan. 23, 1951 |
| 2,577,049 | Uline | Dec. 4, 1951 |
| 2,665,328 | Atkinson et al. | Jan. 5, 1954 |